United States Patent
Staub et al.

[11] Patent Number: 6,059,312
[45] Date of Patent: May 9, 2000

[54] DUAL CHAMBER AIRBAG

[75] Inventors: Andreas Staub, Sulzbach am Main; Detlev Munsch, Bad Camberg, both of Germany

[73] Assignee: Breed Automotive Technology, Inc., Lakeland, Fla.

[21] Appl. No.: 09/374,354

[22] Filed: Aug. 13, 1999

[30] Foreign Application Priority Data

Oct. 16, 1998 [DE] Germany .................. 198 47 854

[51] Int. Cl.⁷ .................................. B60R 21/24
[52] U.S. Cl. ............... 280/729; 280/743.1; 280/753.2
[58] Field of Search ..................... 280/729, 743.1, 280/743.2, 740, 731

[56] References Cited

U.S. PATENT DOCUMENTS

| | | | |
|---|---|---|---|
| 5,010,663 | 4/1991 | Thornton et al. | 280/728.1 |
| 5,240,283 | 8/1993 | Kishi et al. | 280/729 |

FOREIGN PATENT DOCUMENTS

| | | | |
|---|---|---|---|
| 4004216 | 2/1990 | Germany . | |
| 4101287 | 7/1992 | Germany . | |
| 4142326 | 6/1993 | Germany . | |
| 4-244453 | 9/1992 | Japan | 280/743.1 |
| 4287745 | 10/1992 | Japan . | |
| 4-372439 | 12/1992 | Japan | 280/740 |
| 9188216 | 7/1997 | Japan . | |
| 9188218 | 7/1997 | Japan . | |

*Primary Examiner*—Eric Culbreth
*Attorney, Agent, or Firm*—Lonnie R. Drayer; Beth A. Vrioni

[57] ABSTRACT

An airbag for an airbag module in a vehicle has an upper fabric ply, a lower fabric ply and a middle ply which are connected to one another along their circumferential regions. The middle ply extends between the upper fabric ply and the lower fabric ply essentially parallel to these and is firmly connected to the upper fabric ply and the lower fabric ply with a direct close fit only along its circumference. The lower fabric ply has a gas inlet port and the middle ply has a gas passage.

15 Claims, 3 Drawing Sheets

DUAL CHAMBER AIRBAG

FIELD OF THE INVNENTION

The present invention relates to an airbag for an airbag module in a vehicle.

BACKGROUND OF THE INVENTION

In known airbag modules, a deploying airbag may put a vehicle occupant at risk of injury if the vehicle occupant is "out of position". In such "out of position" cases, for example when the head of the vehicle occupant is too near the airbag module, the deployment of a conventional airbag could push the head of the vehicle occupant rearwardly.

The object of the present invention is to provide an improved airbag for an airbag module, which affords reliable protection and a reduced risk of injury to a vehicle occupant who is "out of position".

DISCUSSION OF THE PRIOR ART

Airbags with multiple chambers have been disclosed, for example, in JP 04-287745 A; DE 4142326 A1; De 4101287 A1; DE 4004216 A1; JP 09-188216 A; and JP 09-188218 A.

SUMMARY OF THE INVENTION

An airbag according to the invention has an upper fabric ply, a lower fabric ply and a middle ply that preferably likewise comprises a fabric. These three plies are connected to one another along their circumferences, for example, by stitching or welding along the edges. In this case, the middle ply extends between the upper and lower fabric plies essentially parallel to these, so two chambers are formed in the airbag. A first chamber is located between the upper fabric ply, which faces a vehicle occupant, and the middle ply. A second chamber is located between the middle ply and the lower fabric ply. In this case, the middle ply is firmly connected to the upper and lower fabric plies with a direct close fit only along its circumference. This connection is preferably made by stitching or welding along the seam by which the upper and lower fabric plies are connected to one another. It is preferred, at the same time, that, apart from this circumferential connection, there is no further direct, that is to say close fitting connection or seam between the middle ply and the upper and lower fabric plies.

Preferably, a tear-open connection, for example a tear open seam, may be arranged between the fabric plies and, when the airbag is being inflated, opens, so that the fabric plies can be separated from one another. The deployment or inflation of the individual chambers can be controlled using tear seams, that is to say it is possible to influence which regions of the chambers are inflated first, in order to achieve optimum protection for the vehicle occupant.

When an airbag according to the invention is fully inflated the middle ply is spaced both from the upper fabric ply and from the lower fabric ply, so that the airbag is divided into two chambers. In order to inflate the airbag, the lower fabric ply has a gas inlet port, through which a gas can be introduced into the airbag. When the airbag is being inflated, gas provided by an inflator flows first into the second chamber of the airbag, said second chamber extending between the middle ply and the lower fabric ply. The middle ply has a means by which gas can flow therethrough into the first chamber between the upper fabric ply and the middle ply.

If the vehicle occupant is in a "preferred position", that is to say at a specific distance from the airbag module, the airbag will deploy completely in the event of a crash, so that the gas which is introduced into the airbag flows through the second chamber into the first chamber and fills both chambers completely. However, if the vehicle occupant is too near the airbag module ("out of position" scenario), the airbag may not deploy completely, since it comes into contact beforehand with the vehicle occupant. In this case, the upper fabric ply first comes in contact with the vehicle occupant, the middle ply being pressed against the upper fabric ply by the gas filling the second chamber, so that the gas passages in the middle ply are also pressed against the upper fabric ply and consequently closed. Gas therefore cannot flow into the first chamber between the upper fabric ply and the middle ply, thereby preventing the first chamber from being inflated, so that the airbag cannot be completely inflated. Since the airbag does not inflate completely if the vehicle occupant is too near the airbag module, the vehicle occupant is less likely to be pushed rearwardly. The excess gas, which is not required when the first chamber is not filled, can be discharged through at least one outflow port advantageously designed in the lower fabric ply. The excess gas can then escape into the environment through these outflow ports. Instead of these outflow ports in the lower fabric ply, corresponding outflow devices may also be designed directly on the inflator.

It is further preferred that the outflow ports be provided with a valve device which opens the outflow port at a predetermined internal pressure in the airbag. It is thereby possible to ensure that the airbag is first inflated sufficiently to afford adequate protection for the vehicle occupant, before excess gas is discharged into the environment. This valve device may be designed, for example, in the form of a predetermined breaking point or tear seam which yields under a specific force and which then opens the outflow port. The airbag is thus either fully inflated or inflated until it comes into contact with the vehicle occupant, with the result that said airbag, that is to say the upper fabric ply and the middle ply, is restrained in its movement, thus leading to a higher internal pressure. This increased internal pressure then causes the outflow ports to open, so that the airbag can no longer deploy any further or the airbag can be prevented from bursting.

Advantageously, at least one overflow port is disposed in the middle ply. Particularly when the middle ply comprises a gas impermeable material, an overflow port of this type or a plurality of overflow ports are provided, in order to allow the gas to overflow in a controlled manner out of the second chamber into the first chamber, in order to inflate the latter, too, with gas.

The overflow port is advantageously covered at least partially, on that side of the middle ply which faces the upper fabric ply, by a fabric portion which extends parallel to the middle ply and which, at least in a part region of its circumference, defines a flow path parallel to the middle ply. Such a fabric portion acts as a diffuser which deflects a gas stream, flowing out of the second chamber into the first chamber, in such a way that the gas in the first chamber is distributed primarily laterally, that is to say parallel with the middle ply and the upper fabric ply. Radial expansion of the airbag, starting from the preferably centrally arranged inflator, is thus accelerated or assisted. Advantageously, the inflator or its outflow ports are also designed in such a way that the gas flowing out of the inflator into the second chamber of the airbag is likewise preferably distributed initially laterally or radially, starting from the inflator, and essentially parallel to the lower fabric ply and the middle ply, in order initially to accelerate the expansion in width of the airbag.

The overflow port is preferably provided with a one way valve. Such a one way valve ensures that, although the gas can flow out of the second chamber into the first chamber of the airbag, it cannot flow back again through the overflow port into the second chamber of the airbag after the end of the filling operation. This ensures that the chamber of the airbag facing the vehicle occupant remains inflated as long as possible to afford sufficient protection in the event of a secondary impact of the vehicle occupant against the airbag, even if the second chamber of the airbag has already deflated.

Preferably, the overflow port is located in the region of the center of the middle ply. The advantage of locating one or more overflow ports in the center of the middle ply is that this is the region which will come into contact with the vehicle occupant first, so that, if the occupant is not in a preferred position, precisely that region of the overflow ports, together with the upper fabric ply, is pressed against the vehicle occupant and the overflow ports are sealed off by the upper fabric ply. In this case, therefore, filling of the first chamber of the airbag between the upper fabric ply and the middle ply is prevented. The excess gas is then discharged through corresponding outflow ports.

BRIEF DESCRIPTION OF THE DRAWINGS

The invention is described below by way of example with reference to the accompanying drawings in which.

DETAILED DESCRIPTION OF THE INVENTION

Figure 1:
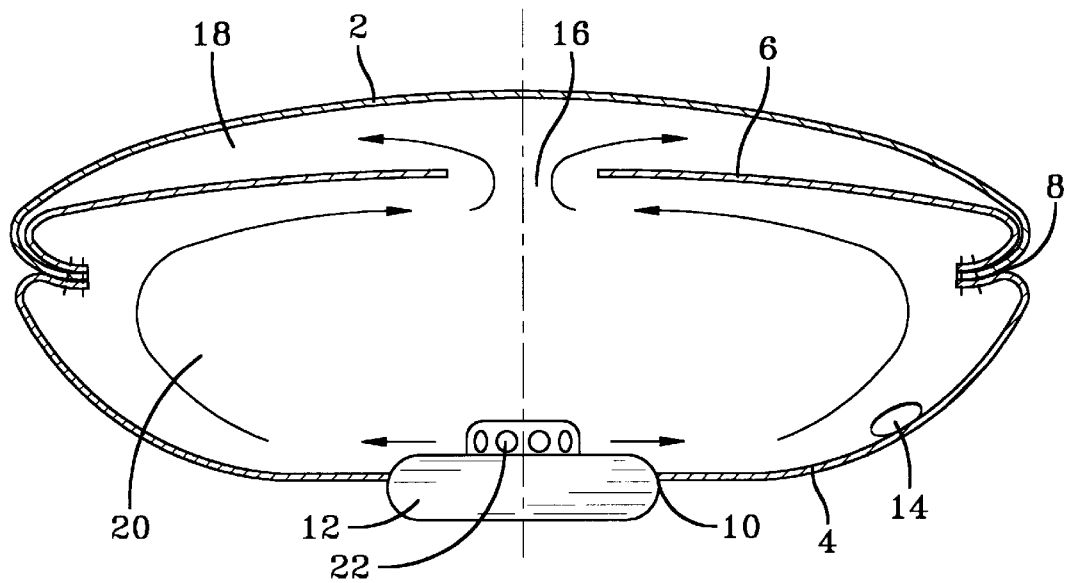
FIG. 1 shows a section through a completely inflated airbag according to a first embodiment of the invention.

The airbag shown in FIG. 1 comprises an upper fabric ply 2, a lower fabric ply 4, and a middle ply 6 that is likewise made from a fabric. The three plies have an essentially identical circumferential shape and are firmly connected to one another along their circumferential edges by a seam 8. The lower fabric ply 4 has a gas inlet port 10, through which an inflator 12 extends into the interior of the airbag. Furthermore, an outflow port 14, through which gas can escape from the airbag into the environment, is located in the lower fabric ply. The plies advantageously have an essentially round or circular circumferential shape, and the gas inlet port 10 is arranged essentially in the center of the lower fabric ply 4. Furthermore, the middle ply 6 has a means by which gas can then flow therethrough, such as an overflow port 16 disposed substantially in the center thereof.

The middle ply 6 divides the airbag, enclosed by the upper fabric ply 2 and the lower fabric ply 4, into two chambers 18, 20. The first chamber 18 is formed between the middle ply and the upper fabric ply and faces the vehicle interior or a vehicle occupant. The second chamber 20 is formed between the middle ply and the lower fabric ply, and is connected to the first chamber 18 via an overflow port 16. When the airbag is being inflated, the inflator 12 provides a gas that flows through gas outlet ports 22, directed essentially radially outward, into the second chamber 20 of the airbag. In this embodiment, the gas flows into the airbag along a path indicated by the arrows in FIG. 1, mainly transversely to the direction of principal deployment of the airbag, said direction being toward the vehicle occupant. This causes the airbag to be inflated as quickly as possible radially, that is to say transversely to the direction of principal deployment, in order to cover a large area before it moves toward the vehicle occupant in the direction of principal deployment. Increased safety may thereby be achieved if the vehicle occupant is not exactly centered in front of the airbag. The gas then flows out of the second chamber 20 through the overflow port 16 into the first chamber 18 of the airbag to fill this chamber. In this case, a throttle effect, by which the rate of inflating the second chamber can be predetermined, may be achieved by an appropriate design of the overflow port 16. In the embodiment shown in FIG. 1, the vehicle occupant is far enough away from the airbag module that the airbag can deploy completely. When the airbag is fully inflated, excess gas emerges into the environment through the outflow port 14. Even when the airbag subsequently deflates and collapses the gas can escape through the outflow port. A valve may advantageously be arranged in the outflow port, said valve opening the outflow port only at a predetermined internal pressure of the second chamber 20, so that sufficient inflation of the airbag can be ensured before gas is discharged into the environment.

The means by which gas can then flow through the middle ply 6 is to have the middle ply comprise at least partially a gas permeable material. Such a gas permeable material allows the gas to flow from the second chamber into the first chamber of the airbag over a large area.

In another preferred embodiment, the means by which gas can flow through the middle ply 6 is totally formed from a gas impermeable material. It is thereby possible to ensure that when the upper fabric ply also comprises a gas impermeable material the gas is prevented from escaping prematurely from the first chamber after it has been filled, so that at least the first chamber of the airbag remains inflated to afford sufficient protection for the vehicle occupant.

Preferably, the upper and/or the lower fabric plies comprise an at least partially gas permeable material. Such a gas permeable material may replace corresponding outflow ports completely or partially, since the gas can escape through the fabric over a large area. The terms "gas impermeable" and "gas permeable", which are used in the claims and the description, come from DIN 53887. Gas impermeability is present in the case of a gas throughput of <10 liter/(dm2/min).

Figure 2:
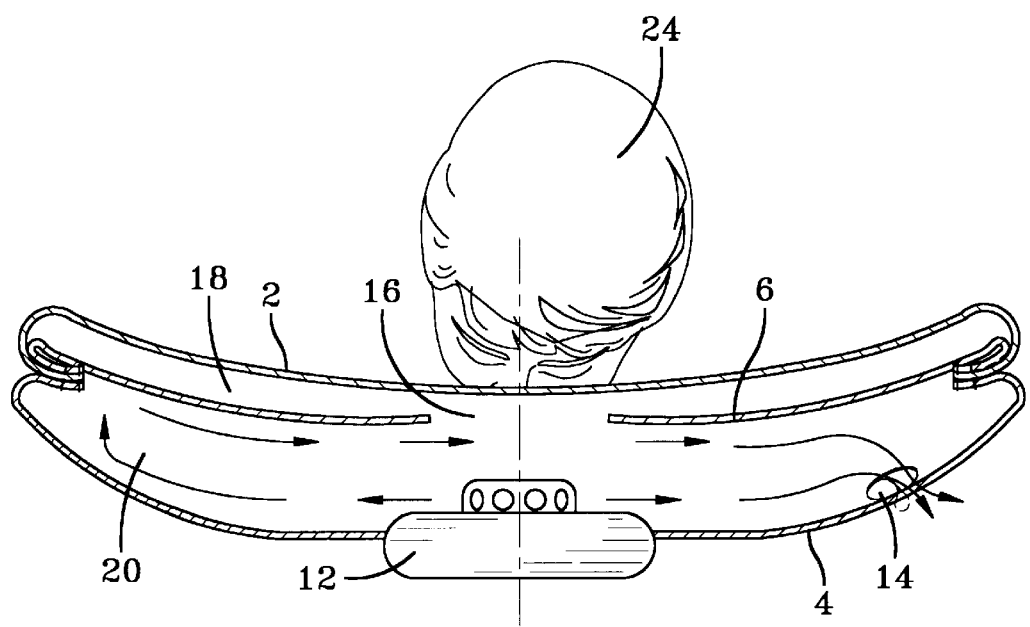
FIG. 2 shows a section through an incompletely inflated airbag according to the first embodiment of the invention.

FIG. 2 shows a section through the airbag according to the first embodiment of the invention, in the scenario in which the head 24 of the vehicle occupant is too near the airbag module or the airbag ("out of position" scenario). Here too, when the inflator 12 is activated, the gas provided by the latter, starting from the inflator, flows radially, essentially transversely to the direction of principal deployment, into the second chamber 20 between the middle fabric ply 6 and the lower fabric ply 4. In this scenario, the airbag inflates until the middle ply presses the upper fabric ply 2 against the head of a vehicle occupant. At this point, further movement of the upper fabric ply is restrained or prevented by the head of the vehicle occupant. Since the middle ply 6 is simultaneously pressed against the upper fabric ply, the overflow port 16 in the middle ply is likewise pressed against the upper fabric ply and is sealed off by the latter. This prevents the possibility that further gas will flow into the first chamber 18 of the airbag. The gas still continuing to flow out of the inflator 12 is discharged into the environment through the outflow port 14. This ensures that the airbag is inflated to a lower pressure and minimizes risks of injury to the vehicle occupant. If the outflow port is provided with a valve device, as described above, the latter will open even in this case, since, in spite of the still incomplete inflation of the airbag and, in particular, of the first chamber 18, the internal pressure necessary for opening the valve device can already be reached in the second chamber 20. Since the airbag cannot move further toward the vehicle occupant in its direction of principal deployment, or is restrained in its movement, the gas continuing to flow out of the inflator 12 leads to an increase in the internal pressure in the second chamber 20, and this may cause the valve device in the outflow port 14 shown schematically in FIG. 3 to open.

Figure 3:
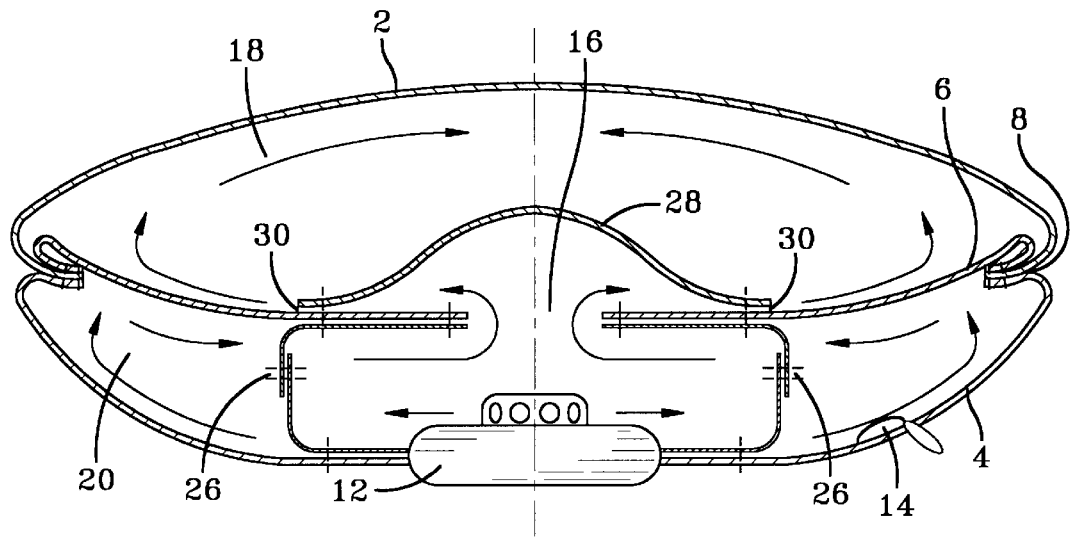
FIG. 3 shows a section through a completely inflated airbag according to a second embodiment of the invention.
Figure 5:
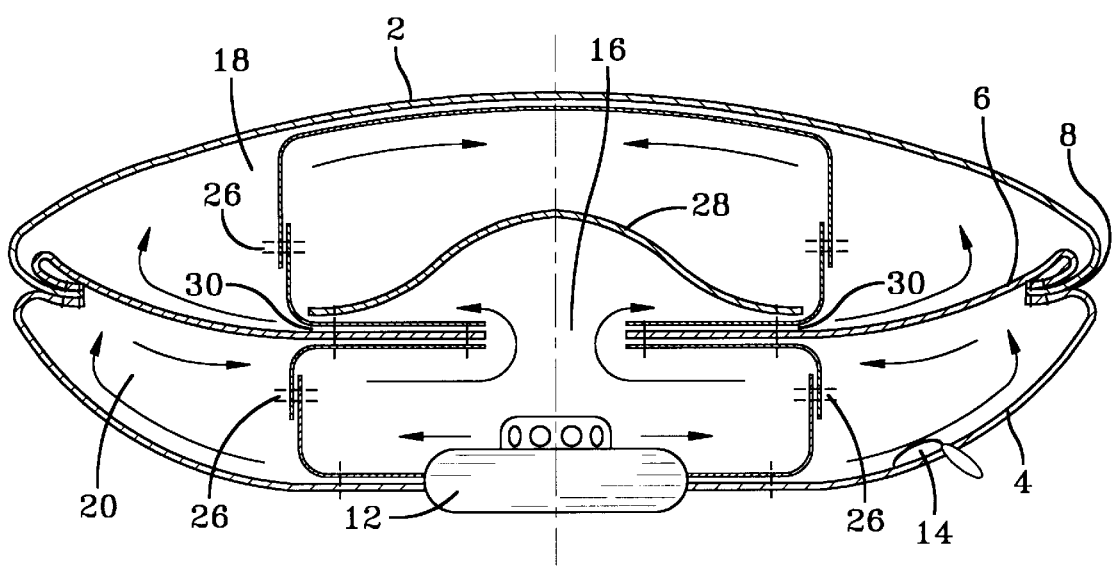
FIG. 5 shows a section through a completely inflated airbag according to another embodiment of the invention.

FIG. 3 shows a section through a second embodiment of the airbag according to the invention in a fully deployed state. The general design of the second embodiment corresponds essentially to the design of the airbag according to the invention, as explained with reference to FIG. 1. The airbag according to the second embodiment of the invention likewise comprises of an upper fabric ply 2, a lower fabric ply 4 and a middle ply 6 that are firmly connected to one another along their circumference by a seam 8. In contrast to the embodiment explained with reference to FIG. 1, retaining bands 26 are arranged in the second chamber 20, said retaining bands connecting the middle ply 6 and the lower fabric ply 4 to one another at a specific distance from one another. The purpose of this is to ensure that the middle ply 6 and the lower fabric ply 4 cannot move apart from one another beyond this predetermined length of the retaining bands 26. A specific shape can thereby be predetermined for the airbag. In particular, it is thus possible to predetermine up to what size or length in the direction of principal deployment the second chamber 20 can expand. The shape of the first chamber 18 is consequently also influenced indirectly. In addition, retaining bands may also be arranged in the first chamber 18 shown schematically in FIG. 5. The retaining bands 26 are designed as fabric portions which are stitched or welded to the middle ply 6 and the lower fabric ply 4.

Furthermore, in this second embodiment, a diffuser is arranged in the first chamber 18 and ensures that the gas flow flowing into the first chamber 18 is deflected. The diffuser is formed by a fabric portion 28 which extends in the first chamber 18 over the overflow port 16 and is connected to the middle ply 6, at least in portions, in the region of the circumference of the overflow port 16. This connection, which is made, for example, by welding or stitching, is designed in such a way that flow passages 30 are obtained in the circumferential region of the diffuser between the fabric portion 28 forming the diffuser and the middle ply 6, said flow passages extending essentially parallel to the middle ply 6 and radially to the overflow port 16. This causes the gas, which flows out of the second chamber 20 through the overflow port 16, to flow against the fabric portion 28 of the diffuser, to be deflected at the latter and then to flow essentially laterally through the flow passages 30 into the first chamber 18. A lateral inflow is also achieved in the first chamber in this way, and it is also achieved in the second chamber 20 by the gas outlet ports 22 of the inflator 12 which extend transversely to the direction of principal deployment, as explained with reference to FIG. 1. This causes the airbag initially to deploy essentially radially, before it moves to an increased extent toward the vehicle occupant. The fabric portion 28 serves not only as a diffuser, but, furthermore, as a one way valve. When the first chamber 18 is filled completely and the gas flows out of the second chamber 20 through the outflow port 14 into the environment after the end of the filling operation, excess inflation pressure occurs in the first chamber 18 in relation to the second chamber 20 and presses the fabric portion 28 against the middle ply 6, so that the flow passages 30 are closed and no further gas can escape out of the first chamber 18 through the overflow port 16 back into the second chamber 20. A longer useful life of the first chamber 18 in the inflated state can be achieved in this way. The airbag can thus still afford sufficient protection even in the event of a further impact of the vehicle occupant.

Figure 4:
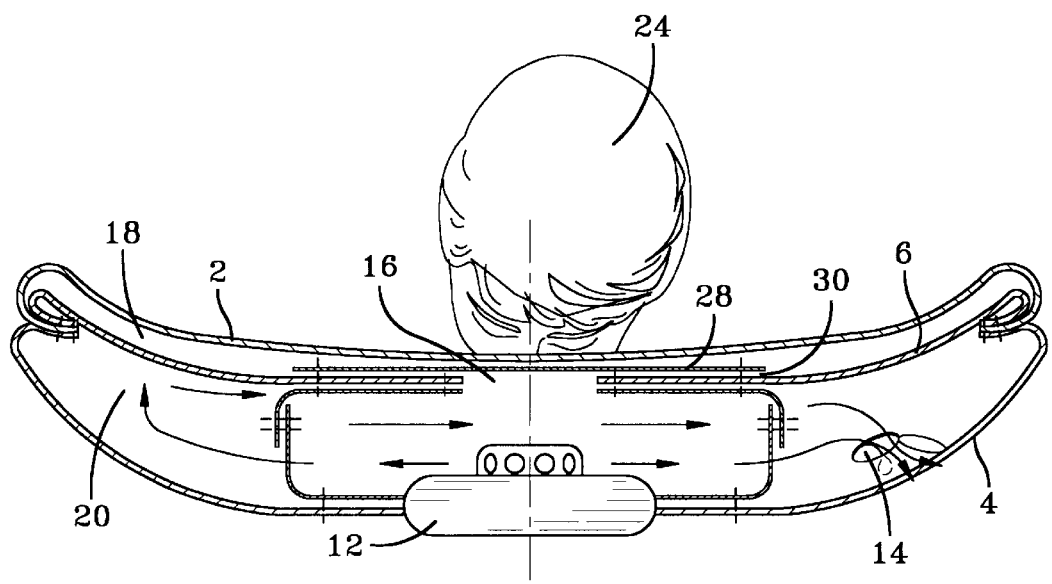
FIG. 4 shows a section through an incompletely inflated airbag according to the second embodiment of the invention.

FIG. 4, then, shows a section through the second embodiment of the airbag, in the scenario where the vehicle occupant is not in a "desired position", but the head 24 is too near the airbag. As explained previously, here too, the second chamber 20 between the lower fabric ply 4 and the middle ply 6 inflates first. During the inflation of the second chamber 20 with gas provided by the inflator 12, the middle ply 6 is first pressed against the upper fabric ply 2, so that the middle ply and the upper fabric ply together move toward the head 24 of the vehicle occupant, until the upper fabric ply 2 comes in contact with the head. At this point, further movement of the upper fabric ply 2 and of the middle ply 6 is prevented or restrained. In this embodiment the fabric portion 28 that forms the diffuser is located between the upper fabric ply and the middle ply. The fabric portion 28 is therefore pressed against the middle ply, so that said portion closes the overflow port 16. Gas therefore cannot flow out of the second chamber 20 through the overflow port 16 and the flow passages 30, which are now closed, into the first chamber 18. As in the embodiment described with reference to FIG. 2, too, here again, the airbag can deploy to a lower pressure and the further gas provided by the inflator 12 flows out through the outflow port 14 into the environment. Here too, if appropriate, a valve may be arranged in the outflow port 14 shown schematically in FIG. 4 and opens only at a specific internal pressure in the second chamber 20. In the second embodiment, too, it is thus possible to ensure reliably that the airbag inflates to a lower pressure after it has come into contact with a vehicle occupant who is out of a "desired position". The risk of injury to a vehicle occupant who is out of a "desired position" can therefore be minimized considerably by the airbag according to the invention.

Preferably, at least one tether of predetermined length is arranged between the upper fabric ply and the middle ply and/or between the lower fabric ply and the middle ply. Tethers of this type serve for giving the airbag a predetermined shape in the inflated state by preventing the individual fabric plies from moving away from one another beyond a predetermined amount. By an appropriate arrangement of the tethers the shape of the airbag in the inflated state can be adjusted in such a way as to afford optimum protection for the vehicle occupant.

Many changes and modifications in the above described embodiments of the invention can, of course, be carried out without departing from the scope thereof. Accordingly, that scope is intended to be limited only by the scope of the appended claims.

What is claimed is:

1. An airbag comprising an upper fabric ply, a lower fabric ply and a middle ply, the plies having a circumferential region and being connected to one another along their circumferential regions, the middle ply extending between the upper fabric ply and the lower fabric ply essentially parallel to these and being firmly connected to the upper fabric ply and the lower fabric ply with a direct close fit only along its circumference, the lower fabric ply having a gas inlet port, and the middle ply having a means by which gas can then flow therethrough including at least one overflow port formed in the middle ply, wherein said overflow port is covered at least partially, on that side of the middle ply which faces the upper fabric ply by a fabric portion which extends parallel to the middle ply and which, at least in a part of a circumferential region of the fabric portion, defines a flow path for a gas parallel to the middle ply.

2. The airbag claimed in claim 1 wherein at least one outflow port is formed in the lower fabric ply.

3. The airbag claimed in claim 2 wherein the outflow port is provided with a valve device that opens the outflow port at a predetermined internal pressure in the airbag.

4. The airbag claimed in claim 1 wherein the middle ply comprises an at least partially gas permeable material.

5. The airbag claimed in claim 1 wherein the middle ply comprises a gas impermeable material.

6. The airbag claimed in claim 1 wherein the fabric portion is a one way valve.

7. The airbag claimed in claim 1 wherein at least one retaining band of predetermined length is arranged between the lower fabric ply and the middle ply.

8. The airbag claimed in claim 1 wherein the upper fabric ply comprises an at least partially gas permeable material.

9. The airbag claimed in claim 1 wherein the lower fabric ply comprises an at least partially gas permeable material.

10. The airbag claimed in claim 1 wherein the upper fabric ply and the lower fabric ply comprise an at least partially gas permeable material.

11. The airbag claimed in claim 1 wherein at least one retaining band of predetermined length is arranged between the upper fabric ply and the middle ply.

12. The airbag claimed in claim 1 wherein at least one retaining band of predetermined length is arranged between the upper fabric ply and the middle ply and between the lower fabric ply and the middle ply.

13. The airbag claimed in claim 1 wherein if a vehicle occupant presses the upper ply, the upper ply presses against the fabric portion closing the overflow port.

14. An airbag comprising an upper fabric ply, a lower fabric ply and a middle ply, which have a circumferential region and are connected to one another along their circumferential regions, the middle ply extending between the upper fabric ply and the lower fabric ply essentially parallel to these and being firmly connected to the upper fabric ply and the lower fabric ply with a direct close fit only along its circumference, the lower fabric ply having a gas inlet port, and the middle ply having a means by which gas can then flow there through including at least one overflow port formed in the middle ply, wherein said overflow port is at least partially closed when the middle ply presses the upper ply against a vehicle occupant, further comprising a fabric portion connected to the middle ply facing the upper ply, the fabric portion extending parallel to the middle ply wherein the fabric portion and the middle ply define a flow path for a gas parallel to the middle ply.

15. The airbag claimed in claim 14 wherein the fabric portion is a one way valve.

* * * * *